(12) United States Patent
Singh et al.

(10) Patent No.: US 12,103,396 B2
(45) Date of Patent: Oct. 1, 2024

(54) SELECTIVELY RETRACTABLE SCREEN COVER FOR A VEHICLE

(71) Applicant: GM Global Technology Operations LLC, Detroit, MI (US)

(72) Inventors: Gurnek Singh, Sterling Heights, MI (US); Alfredo J. Fabeiro, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 350 days.

(21) Appl. No.: 17/743,672

(22) Filed: May 13, 2022

(65) Prior Publication Data
US 2023/0364995 A1 Nov. 16, 2023

(51) Int. Cl.
*B60K 35/60* (2024.01)
*B60K 35/22* (2024.01)
*B60K 35/53* (2024.01)

(52) U.S. Cl.
CPC .............. *B60K 35/60* (2024.01); *B60K 35/22* (2024.01); *B60K 35/53* (2024.01)

(58) Field of Classification Search
CPC ........ B60K 35/60; B60K 35/22; B60K 35/53; B60K 35/29; B60K 35/00; B60K 2360/191; B60K 2360/682; B60K 2360/1523; B60K 2360/693; B60R 11/0229; B60R 2011/005; G02B 27/01; G02B 27/0149; G02B 27/0101; B60Q 3/16
USPC .................................................. 296/37.12, 70
See application file for complete search history.

(56) References Cited

U.S. PATENT DOCUMENTS

| | | | | |
|---|---|---|---|---|
| 6,542,305 B2* | 4/2003 | Nakamura | ......... | G02B 27/0149 359/630 |
| 8,002,179 B2* | 8/2011 | Feit | ......... | B60K 35/10 235/382 |
| 9,566,947 B2* | 2/2017 | Huth | ......... | B60S 1/0411 |
| 9,995,995 B2* | 6/2018 | Chen | ......... | B60K 35/00 |
| 10,351,001 B2* | 7/2019 | Beauregard | ......... | B60K 35/50 |
| 10,647,264 B2* | 5/2020 | Forsgren | ......... | B60N 3/002 |
| 11,617,276 B2* | 3/2023 | Song | ......... | B60K 37/10 362/489 |
| 11,904,692 B2* | 2/2024 | Salter | ......... | B62D 25/14 |

FOREIGN PATENT DOCUMENTS

DE 102016007348 A1 * 12/2017 ............. B60K 35/00

* cited by examiner

*Primary Examiner* — Amy R Weisberg
*Assistant Examiner* — Veronica M Shull
(74) *Attorney, Agent, or Firm* — CANTOR COLBURN LLP

(57) ABSTRACT

A system includes a surface, a display screen positioned adjacent to the surface, and a selectively retractable screen cover positioned at the surface adjacent the display screen. The selectively retractable screen cover including a door member rotatably mounted relative to the surface between a first stop, wherein the display screen is fully exposed and a second stop, wherein only the display screen is only partially exposed, the door member including a door pivot. An actuating fork includes a first tine element, a second tine element, and a connector portion defining an axis of rotation. The door pivot is slidingly received between the first tine element and the second tine element. A motor includes a shaft connected to the actuating fork. The motor rotates the shaft to shift the door member between the first stop and the second stop.

20 Claims, 7 Drawing Sheets

SELECTIVELY RETRACTABLE SCREEN COVER FOR A VEHICLE

INTRODUCTION

The subject disclosure relates to the art of vehicles and, more particularly, to a selectively retractable screen cover for a vehicle.

A vehicle may include a variety of display screens that provide information and/or entertainment options for a driver or passenger(s). Certain screens may be interactive. Such screens in addition to providing information, allow a user to make various selections for vehicle features, control vehicle audio, control navigation, and the like. Screens may present primary information, (e.g., information that may be helpful while driving), and secondary information, (e.g., information that is not necessary for the operation of the vehicle). Depending on the display, picking out the primary information from the secondary information may take effort. Accordingly, it is desirable to provide a system for focusing attention on particular portions of a display

SUMMARY

Disclosed, in accordance with a non-limiting example, is a system including a surface, a display screen positioned adjacent to the surface, and a selectively retractable screen cover positioned at the surface adjacent the display screen. The selectively retractable screen cover including a door member rotatably mounted relative to the surface between a first stop, wherein the display screen is fully exposed and a second stop, wherein the display screen is only partially exposed, the door member including a door pivot. An actuating fork includes a first tine element, a second tine element, and a connector portion defining an axis of rotation. The door pivot is slidingly received between the first tine element and the second tine element. A motor includes a shaft connected to the actuating fork. The motor rotates the shaft to shift the door member between the first stop and the second stop.

In addition to one or more of the features described herein a housing is mounted in the surface, the door member being pivotally mounted to the housing.

In addition to one or more of the features described herein the housing includes a first side, a second side that is opposite the first side, and an intermediate portion connecting the first side and the second side, the first side including an outer surface including a first gear portion.

In addition to one or more of the features described herein a second gear portion is mounted to the door pivot, the second gear portion meshing with the first gear portion and including a hub positioned between the first tine element and the second tine element.

In addition to one or more of the features described herein the first gear portion defines a gear rack having a first end defining the first stop and a second end defining the second stop.

In addition to one or more of the features described herein the door member includes a first side portion and a second side portion that is opposite the first side portion, the door pivot including a first door pivot provided on the first side and a second door pivot provided on the second side.

In addition to one or more of the features described herein the actuating fork includes a first actuator member including the first tine element and the second tine element and a second actuator member including a third tine element and a fourth tine element, the second door pivot being arranged between the third tine element and the fourth tine element.

In addition to one or more of the features described herein a torque transmitting member includes a first end section connected to the first actuator member and a second end section, that is opposite the first end section, connected to the second actuator member, the torque transferring member transmitting rotation of the first actuator member to the second actuator member.

In addition to one or more of the features described herein the first actuator member extends substantially perpendicularly relative to the torque transfer member at the first end section and the second actuator member extending substantially perpendicularly relative to the torque transfer member at the second end section.

In addition to one or more of the features described herein the first door pivot is provided at the first actuator member and the second door pivot is provided at the second actuator member.

Also disclosed in accordance with a non-limiting example is a vehicle including a body defining a passenger compartment, a dashboard including a surface, a display screen positioned adjacent to the surface, and a selectively retractable screen cover positioned at the surface adjacent the display screen. The selectively retractable screen cover includes a door member rotatably mounted relative to the surface between a first stop, wherein the display screen is fully exposed and a second stop, wherein only the display screen is only partially exposed, the door member including a door pivot. An actuating fork includes a first tine element, a second tine element, and a connector portion defining an axis of rotation. The door pivot is slidingly received between the first tine element and the second tine element. A motor includes a shaft connected to the actuating fork. The motor rotates the shaft to shift the door member between the first stop and the second stop.

In addition to one or more of the features described herein a housing is mounted in the surface, the door member being pivotally mounted to the housing.

In addition to one or more of the features described herein the housing includes a first side, a second side that is opposite the first side, and an intermediate portion connecting the first side and the second side, the first side including an outer surface including a first gear portion.

In addition to one or more of the features described herein a second gear portion is mounted to the door pivot, the second gear portion meshing with the first gear portion and including a hub positioned between the first tine element and the second tine element.

In addition to one or more of the features described herein the first gear portion defines a gear rack having a first end defining the first stop and a second end defining the second stop.

In addition to one or more of the features described herein the door member includes a first side portion and a second side portion that is opposite the first side portion, the door pivot including a first door pivot provided on the first side and a second door pivot provided on the second side.

In addition to one or more of the features described herein the actuating fork includes a first actuator member including the first tine element and the second tine element and a second actuator member including a third tine element and a fourth tine element, the second door pivot being arranged between the third tine element and the fourth tine element.

In addition to one or more of the features described herein a torque transmitting member includes a first end section connected to the first actuator member and a second end section, that is opposite the first end section, connected to the second actuator member, the torque transferring member transmitting rotation of the first actuator member to the second actuator member.

In addition to one or more of the features described herein the first actuator member extends substantially perpendicularly relative to the torque transfer member at the first end section and the second actuator member extending substantially perpendicularly relative to the torque transfer member at the second end section.

In addition to one or more of the features described herein the first door pivot is provided at the first actuator member and the second door pivot is provided at the second actuator member.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
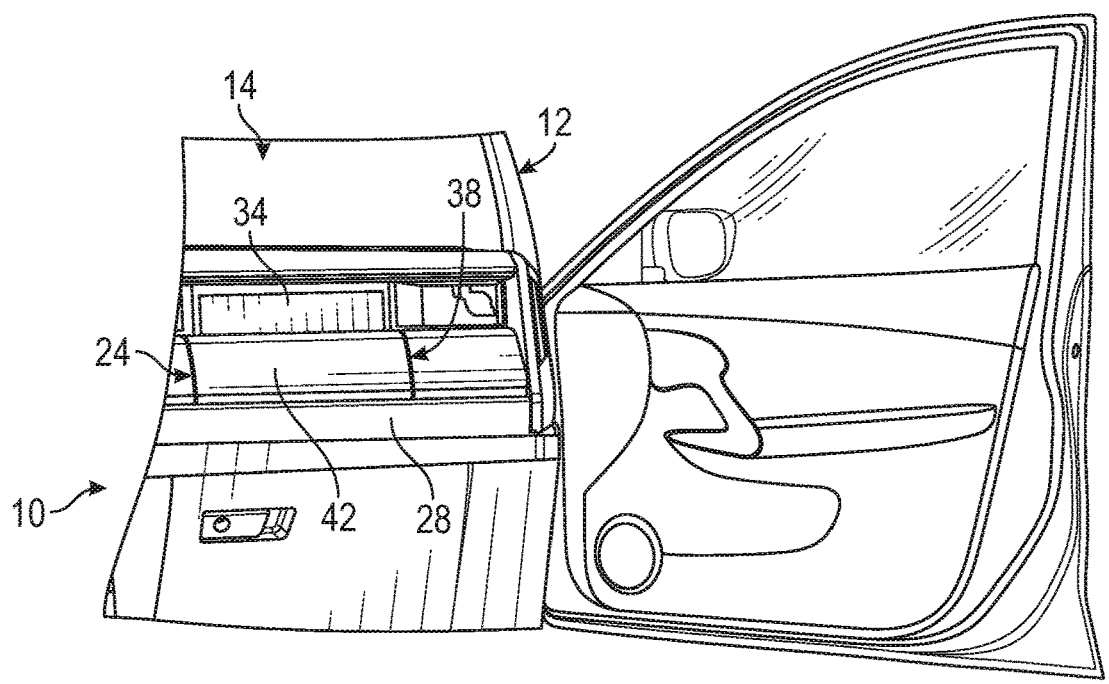
FIG. 1 is a partial view of a vehicle including a selectively retractable screen cover in a first configuration, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with a non-limiting example, is indicated generally at 10 in FIG. 1. Vehicle 10 includes a body 12 defining, in part, a passenger compartment 14. A dashboard 24 is arranged in body 12 at a forward portion (not separately labeled) of passenger compartment 14. Dashboard 24 includes a surface 28 that supports a display screen 34. Display screen 34 may form part of an infotainment system (not shown) that presents information and entertainment options for a driver and/or passengers. For example, display screen 34 may serve as an interface to an audio system, provide navigation instructions, present weather information, or provide updates for one or more vehicle systems. Further, display screen 34 may be a touch screen and thus may define a user interface. The information that may be presented on display screen 34 is, in a non-limiting example, limitless.

Figure 2:
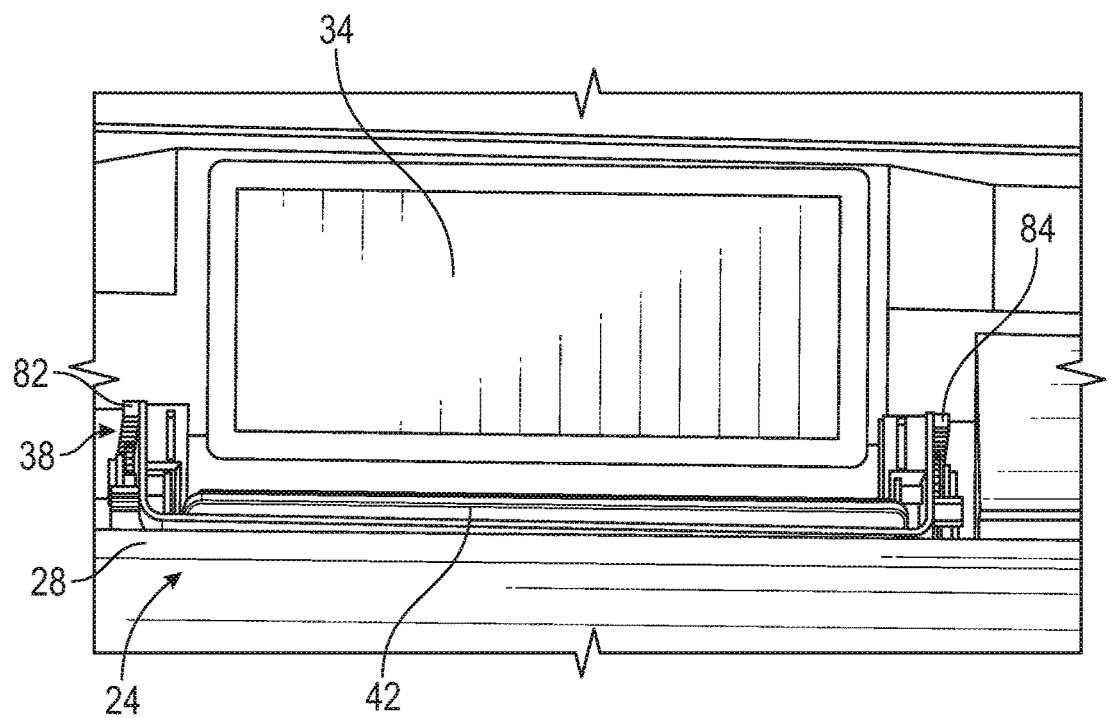
FIG. 2 is a plan view of the selectively retractable screen cover of FIG. 1, in a second configuration, in accordance with a non-limiting example.

In a non-limiting example, vehicle 10 includes a selectively retractable screen cover 38 having a door member 42 that selectively transitions between a first or deployed configuration, such as shown in FIG. 1, and retracts to a second or open configuration such as shown in FIG. 2. In the deployed configuration, door member 42 covers only a portion of display screen 34. In a non-limiting example, door member 42 may only cover about 70% of display screen 34 when fully deployed. It should be understood that the amount of coverage of display screen 34 provided by door member 42 may vary. In the open configuration, display screen 34 is fully exposed.

Figure 3:
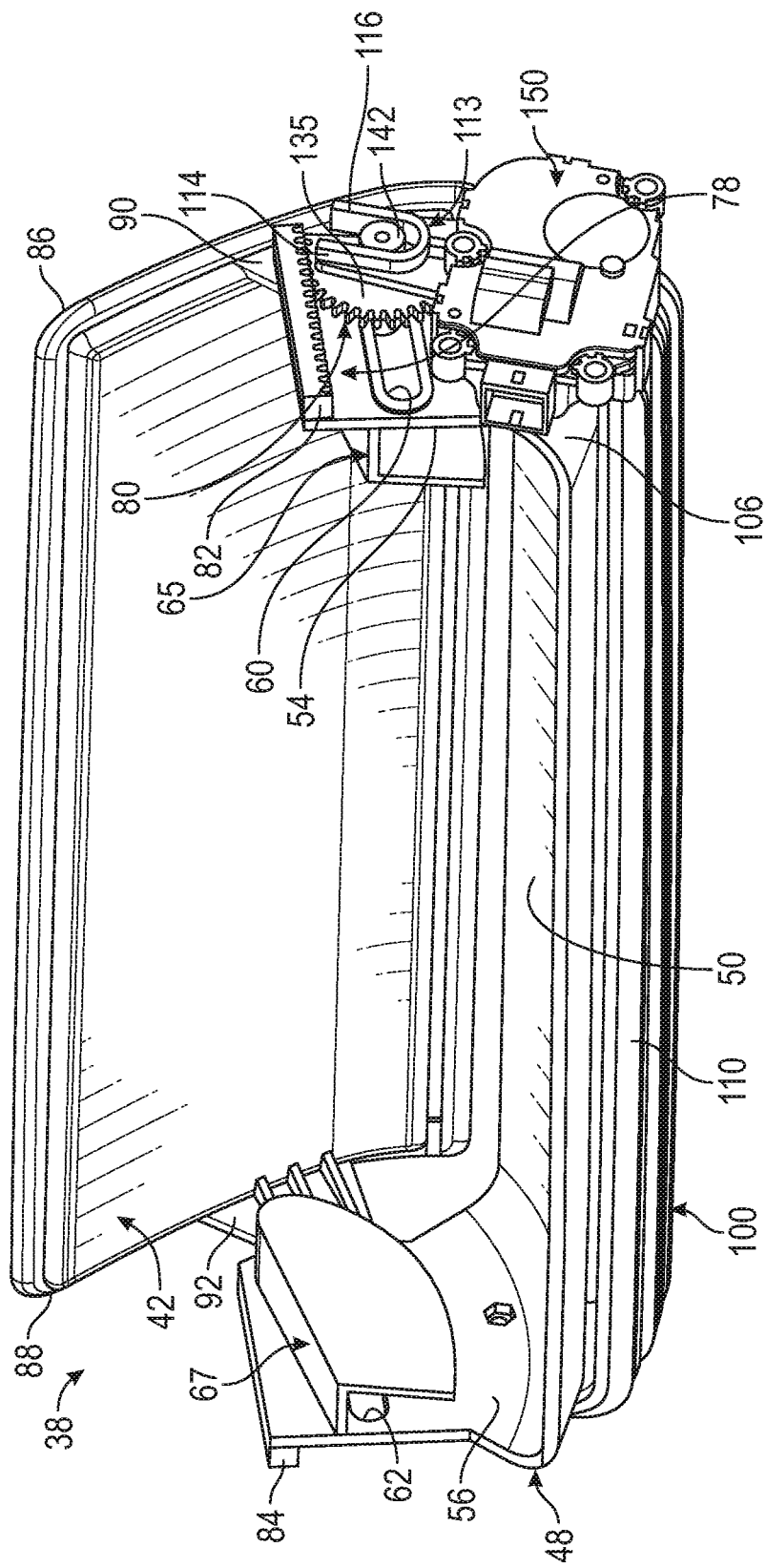
FIG. 3 is a left rear perspective view of the selectively retractable screen cover of FIG. 1, in accordance with a non-limiting example.

Referring to FIG. 3 and with continued reference to FIG. 2, selectively retractable screen cover 38 includes a housing 48 that may be installed into dashboard 24. Housing 48 includes a base wall 50, a first side wall 54, and a second side wall 56 that is opposite to first side wall 54. First side wall 54 includes a first guide track 60 and second side wall 56 includes a second guide track 62. In a non-limiting example, first and second guide tracks 60 and 62 are defined by elongated openings (not separately labeled) formed in corresponding ones of first side wall 54 and second side wall 56.

Figure 4:
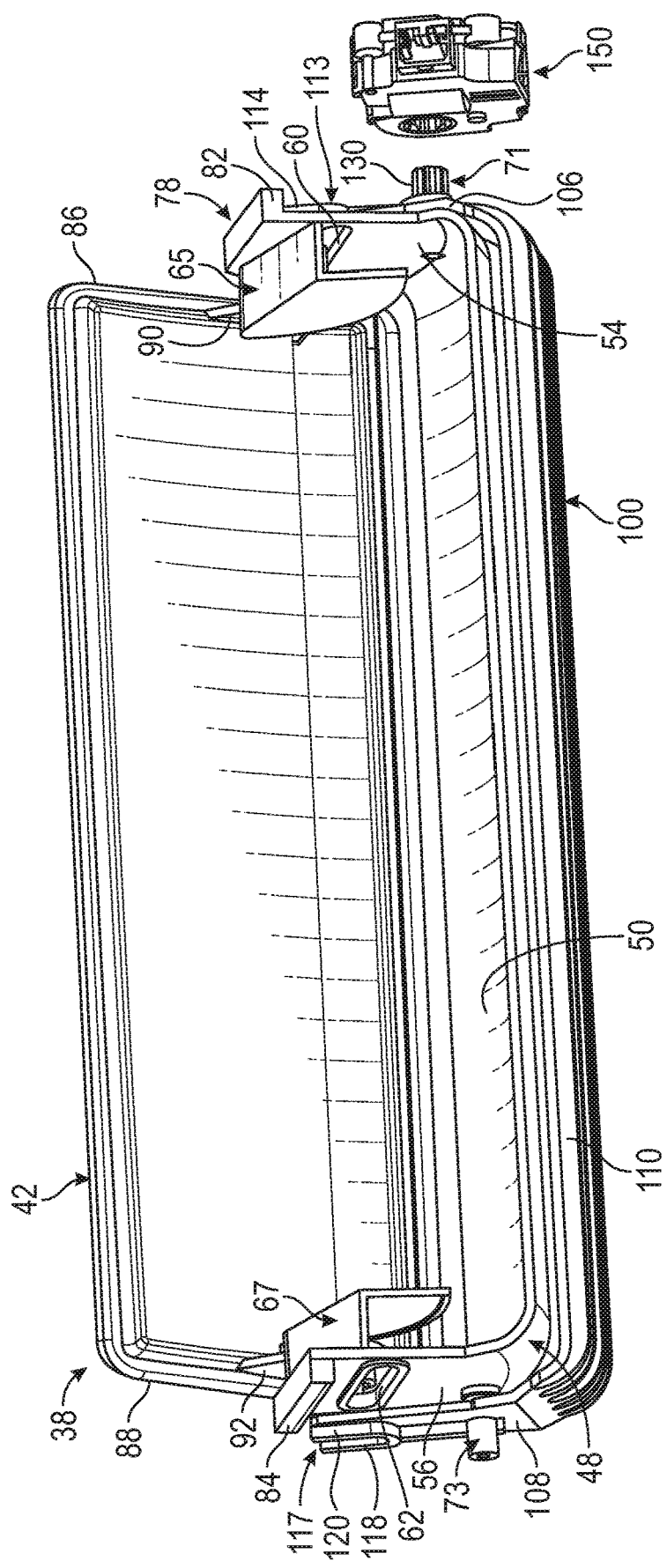
FIG. 4 is a right rear partially disassembled perspective view of the selectively retractable screen cover of FIG. 1, in accordance with a non-limiting example.

In a non-limiting example, first side wall 54 includes a first cover element 65 and second side wall 56 includes a second cover element 67. First cover element 65 projects outwardly of first side wall 54 toward second side wall 56 and downwardly (as viewed in FIG. 3) toward base wall 50. As such, first cover element 65 creates a curtain that is spaced from and extends over first guide track 60. Similarly, second cover element 67 projects outwardly of second side wall 56 toward first side wall 54 and downwardly toward base wall 50. As such, second cover element 67 creates a curtain that is spaced from and extends over second guide track 62. As shown in FIG. 4, first side wall 54 includes a first support member 71 and second side wall 56 includes a second support member 73. First and second support members 71 and 73 are defined by pins that project outwardly of first and second side walls 54 and 56 respectively.

Selectively retractable screen cover 38 includes a first gear portion 78 and a second gear portion 80. First gear portion 78 includes a first gear rack 82 provided on first side wall 54 and a second gear rack 84 provided in second side wall 56. First gear rack 82 is integrally formed with first side wall 54 and extends substantially parallel to first guide track 60. Similarly, second gear rack 84 is integrally formed with second side wall 56 and extends substantially parallel to second guide track 62.

Figure 5:
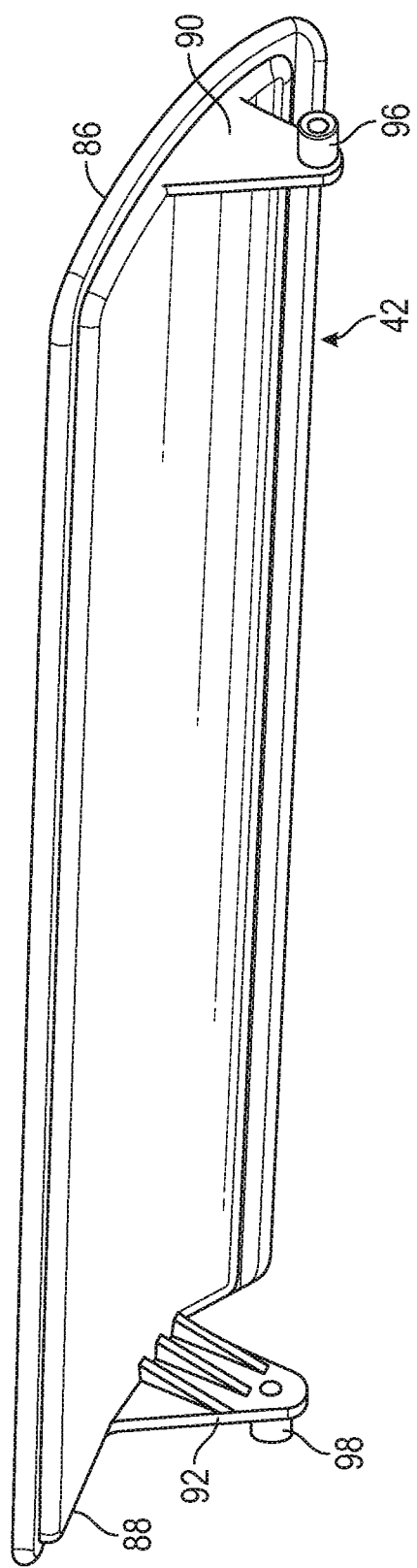
FIG. 5 is a perspective view of a door member of the selectively retractable screen cover, in accordance with a non-limiting example.
Figure 6:
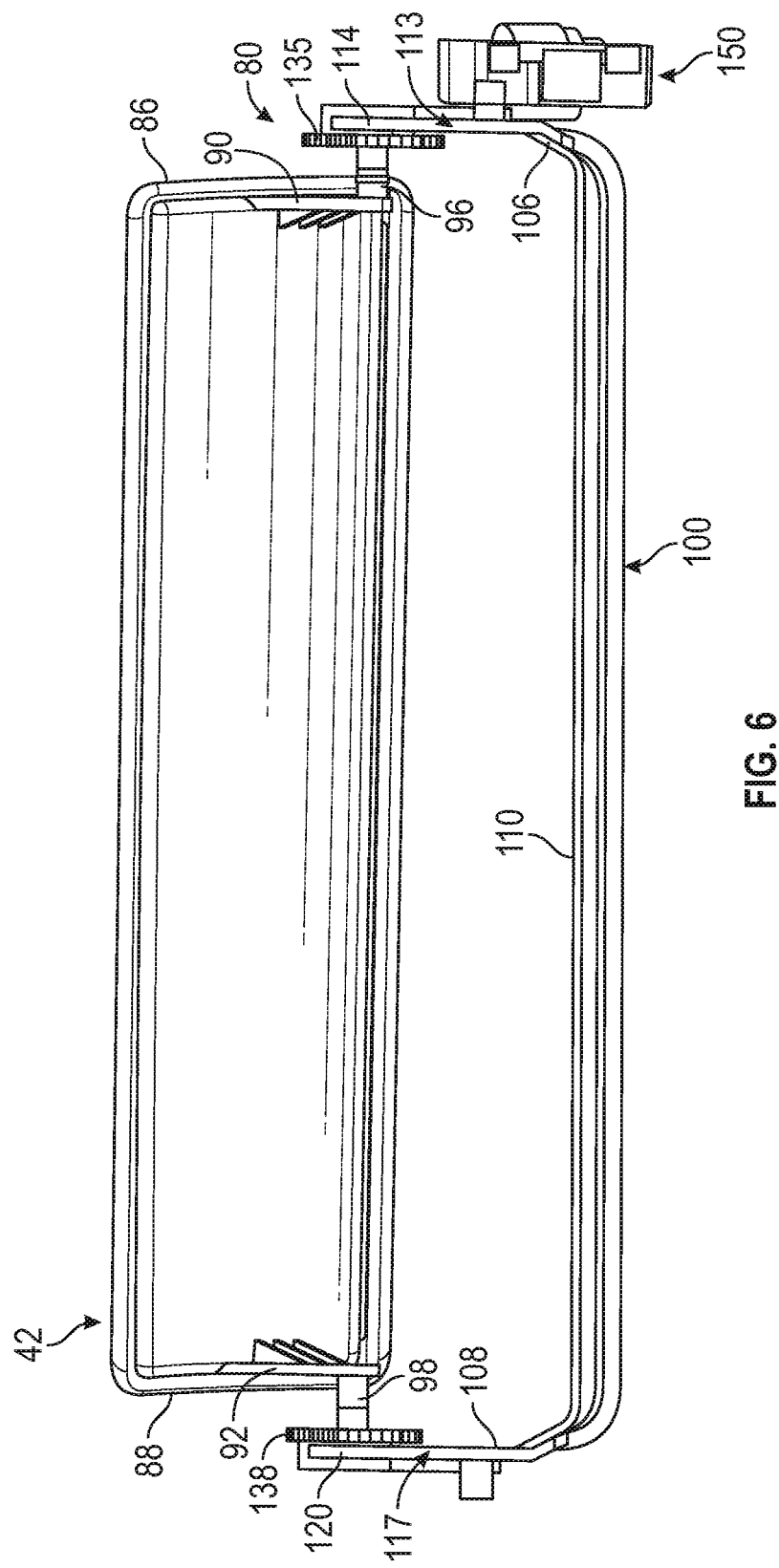
FIG. 6 is a plan view of the door member connected to an actuator, in accordance with a non-limiting example.

Door member 42 includes first end 86 and a second end 88 as shown in FIGS. 5 and 6. A first door support 90 projects outwardly of door member 42 at first end 86. A second door support 92 projects outwardly of door member 42 at second end 88. First door support 90 extends between first guide track 60 and first cover element 65 (FIG. 4). Second door support 94 extends between second guide track 62 and second cover element 67 (FIG. 3). First door support 90 defines a first door pivot 96 and second door support 92 defines a second door pivot 98. Door member 42 pivots or shifts between the first configuration (partially closed) as shown in FIG. 1, and the second configuration (open) as shown in FIG. 2, by shifting first and second door pivots 96 and 98 along first and second guide tracks 60 and 62 as will be detailed herein.

In a non-limiting example shown in FIGS. 3, 4, and 6, selectively retractable screen cover 38 includes an actuator 100 that is operatively connected to first door pivot 96 and second door pivot 98. In a non-limiting example, actuator 100 includes a first actuator member 106, a second actuator member 108, and a torque transmitting member 110. Torque transmitting member 110 extends between and connects first actuator member 106 and second actuator member 108. First actuator member 106 includes a first fork 113 including a first tine element 114 and a second tine element 116. Second actuator member 108 includes a second fork 117 (FIG. 7) including a third tine element 118 and a fourth tine element 120. As will be detailed herein, first and second forks 113 and 117 are operatively connected to door member 42. First actuator member 106 also includes an interface member 130 that receives first support member 71 and defines a pivot axis for actuator 100. Second actuator member 108 may be supported by second support member 73 and secured by a fastener 132 (FIG. 7).

Figure 7:
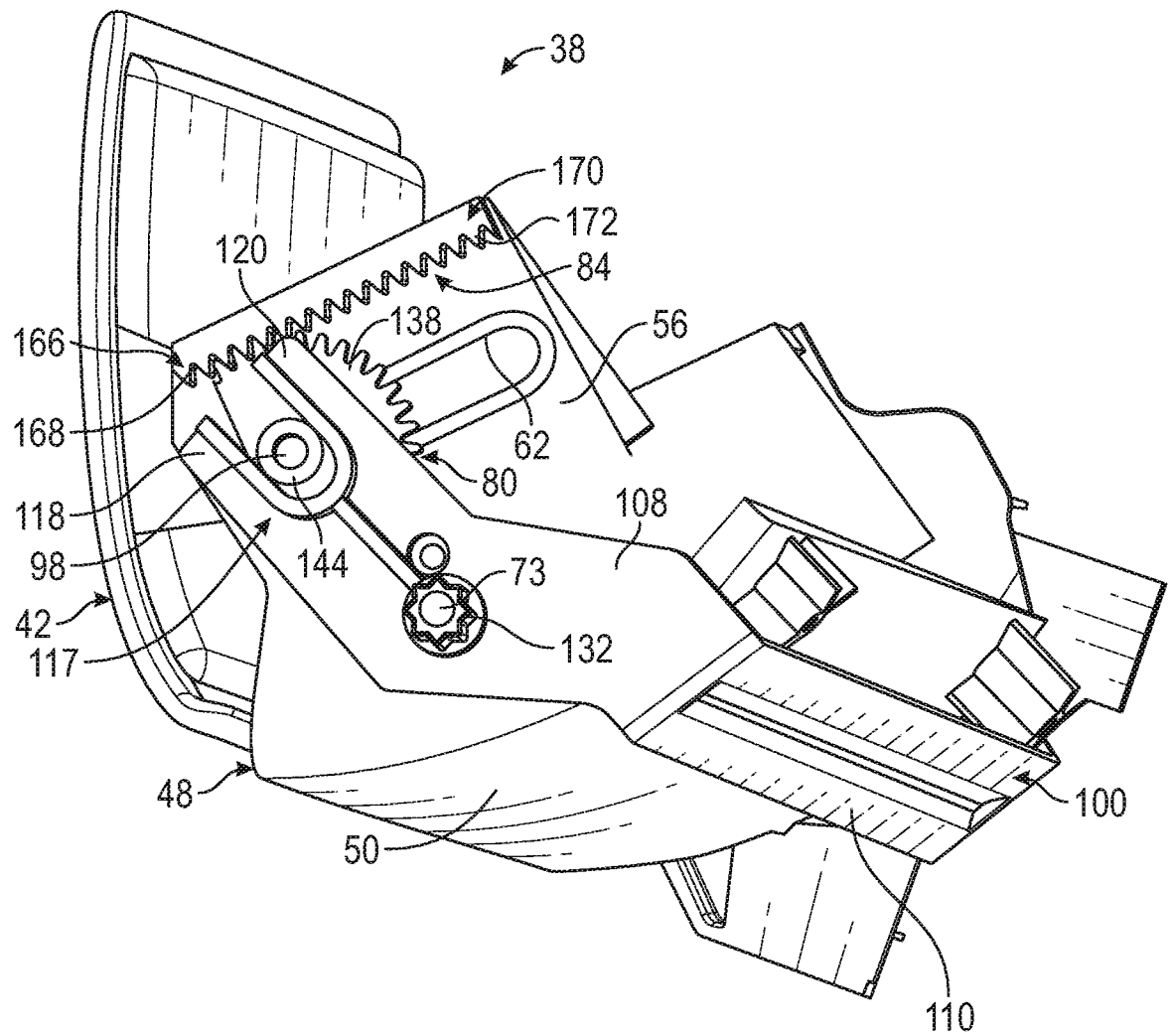
FIG. 7 is a right side view of the selectively retractable screen cover in the first configuration, in accordance with a non-limiting example.
Figure 8:
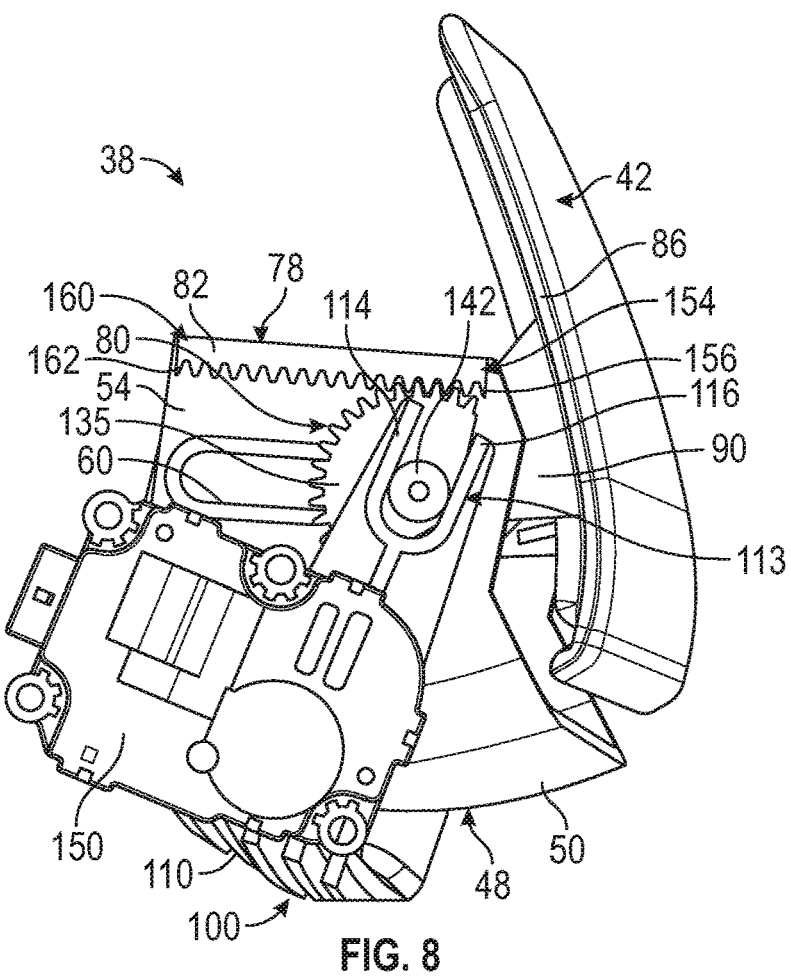
FIG. 8 is a left side view of the selectively retractable screen cover in the first configuration, in accordance with a non-limiting example.
Figure 9:
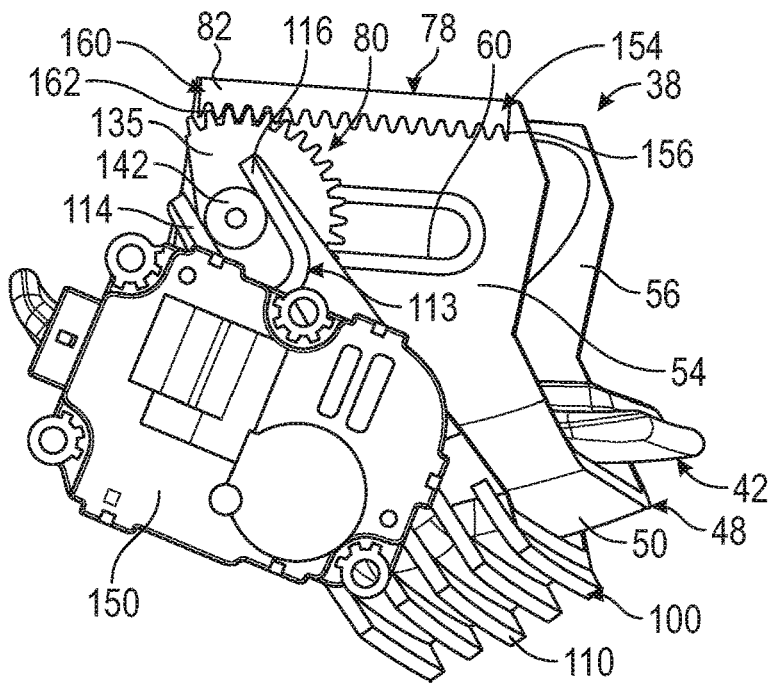
FIG. 9 is a left side view of the selectively retractable screen cover of FIG. 6 in the second configuration, in accordance with a non-limiting example.

In a non-limiting example, shown in FIGS. 6 and 7, second gear portion 80 includes a first pinion gear 135 connected to first door pivot 96 and a second pinion gear 138 that is connected to second door pivot 98. In a non-limiting example, first pinion gear 135 includes a first hub 142 that is positioned between first tine element 114 and second tine element 116 of first fork 113. Second pinion gear 138 includes a second hub 144 that is positioned between third tine element 118 and fourth tine element 120 of second fork 117. First and second pinon gears 135 and 138 interface with first and second gear racks 82 and 84 respectively. With this arrangement, movement of first and second pinon gears 135 and 138 along first and second gear racks 82 and 84 as shown in FIGS. 8 and 9 causes door member 42 to transition between the first configuration and the second configuration as will be detailed herein.

Selectively retractable screen cover 38 includes a motor 150 mounted to housing 48 at first side wall 54. Motor 150 is also operatively connected to actuator 100 through interface member 130 as shown in FIG. 4. When activated, motor 150 pivots actuator 100 about interface member 130 and first support member 71. Referring to FIGS. 7, 8 and 9, movement of actuator 100 is transferred to first pinion gear 135 (FIG. 8) and second pinion gear 138 (FIG. 7). In a non-limiting example, first gear rack 82 includes a first end 154 defining a first end stop 156 and a second end 160, that is opposite first end 154 that defines a second end stop 162. Second gear rack 84 includes a first end 166 defining a first end stop 168 and a second end 170, that is opposite first end 166, that defines a second end stop 172.

Activation of motor 150 transitions door member 42 between the end stops on first and second gear racks 82 and 84. That is, door member 42 may be in the first or partially closed configuration with first pinion gear 135 resting against first end stop 156 of first gear rack 82 (FIG. 8) and second pinion gear 137 resting against first end stop 168 of second gear rack 84. In this position, it should be understood that door member 42 may never fully close. If activated, motor 150 pivots actuator 100 carrying first pinon gear 135 and second pinion gear 137 from first end stops 156 and 168 respectively along corresponding ones of first and second gear racks 82 and 84 toward respective ones of second end stop 162 and second end stop 172. In this position, door member 42 is fully open.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:
1. A system comprising:
a surface;
a display screen positioned adjacent to the surface; and
a selectively retractable screen cover positioned at the surface adjacent the display screen, the selectively retractable screen cover including:
a door member rotatably mounted relative to the surface between a first stop, wherein the display screen is fully exposed and a second stop, wherein only the display screen is only partially exposed, the door member including a door pivot;
an actuating fork including a first tine element, a second tine element, and a connector portion defining an axis of rotation, the door pivot being slidingly received between the first tine element and the second tine element; and
a motor including a shaft connected to the actuating fork, the motor rotating the shaft to shift the door member between the first stop and the second stop.

2. The system according to claim 1, further comprising a housing mounted in the surface, the door member being pivotally mounted to the housing.

3. The system according to claim 2, wherein the housing includes a first side, a second side that is opposite the first side, and an intermediate portion connecting the first side and the second side, the first side including an outer surface including a first gear portion.

4. The system according to claim 3, further comprising a second gear portion mounted to the door pivot, the second gear portion meshing with the first gear portion and including a hub positioned between the first tine element and the second tine element.

5. The system according to claim 4, wherein the first gear portion defines a gear rack having a first end defining the first stop and a second end defining the second stop.

6. The system according to claim 5, wherein the door member includes a first side portion and a second side portion that is opposite the first side portion, the door pivot including a first door pivot provided on the first side and a second door pivot provided on the second side.

7. The system according to claim 6, wherein the actuating fork includes a first actuator member including the first tine element and the second tine element and a second actuator member including a third tine element and a fourth tine element, the second door pivot being arranged between the third tine element and the fourth tine element.

8. The system according to claim 7, further comprising a torque transmitting member including a first end section connected to the first actuator member and a second end section, that is opposite the first end section, connected to the second actuator member, the torque transmitting member transmitting rotation of the first actuator member to the second actuator member.

9. The system according to claim 8, wherein the first actuator member extends substantially perpendicularly relative to the torque transmitting member at the first end section and the second actuator member extending substantially perpendicularly relative to the torque transmitting member at the second end section.

10. The system according to claim 7, wherein the first door pivot is provided at the first actuator member and the second door pivot is provided at the second actuator member.

11. A vehicle comprising:
a body defining a passenger compartment;
a dashboard including a surface;
a display screen positioned adjacent to the surface; and
a selectively retractable screen cover positioned at the surface adjacent the display screen, the selectively retractable screen cover including:
  a door member rotatably mounted relative to the surface between a first stop, wherein the display screen is fully exposed and a second stop, wherein only the display screen is only partially exposed, the door member including a door pivot;
an actuating fork including a first tine element, a second tine element, and a connector portion defining an axis of rotation, the door pivot being slidingly received between the first tine element and the second tine element; and
a motor including a shaft connected to the actuating fork, the motor rotating the shaft to shift the door member between the first stop and the second stop.

12. The vehicle according to claim 11, further comprising a housing mounted in the surface, the door member being pivotally mounted to the housing.

13. The vehicle according to claim 12, wherein the housing includes a first side, a second side that is opposite the first side, and an intermediate portion connecting the first side and the second side, the first side including an outer surface including a first gear portion.

14. The vehicle according to claim 13, further comprising a second gear portion mounted to the door pivot, the second gear portion meshing with the first gear portion and including a hub positioned between the first tine element and the second tine element.

15. The vehicle according to claim 14, wherein the first gear portion defines a gear rack having a first end defining the first stop and a second end defining the second stop.

16. The vehicle according to claim 15, wherein the door member includes a first side portion and a second side portion that is opposite the first side portion, the door pivot including a first door pivot provided on the first side and a second door pivot provided on the second side.

17. The vehicle according to claim 16, wherein the actuating fork includes a first actuator member including the first tine element and the second tine element and a second actuator member including a third tine element and a fourth tine element, the second door pivot being arranged between the third tine element and the fourth tine element.

18. The vehicle according to claim 17, further comprising a torque transmitting member including a first end section connected to the first actuator member and a second end section, that is opposite the first end section, connected to the second actuator member, the torque transmitting member transmitting rotation of the first actuator member to the second actuator member.

19. The vehicle according to claim 18, wherein the first actuator member extends substantially perpendicularly relative to the torque transmitting member at the first end section and the second actuator member extending substantially perpendicularly relative to the torque transmitting member at the second end section.

20. The vehicle according to claim 7, wherein the first door pivot is provided at the first actuator member and the second door pivot is provided at the second actuator member.

* * * * *